June 16, 1936. H. L. PELZER Re. 20,011
ART OF CRACKING AND COKING HYDROCARBON OILS
Original Filed April 17, 1929
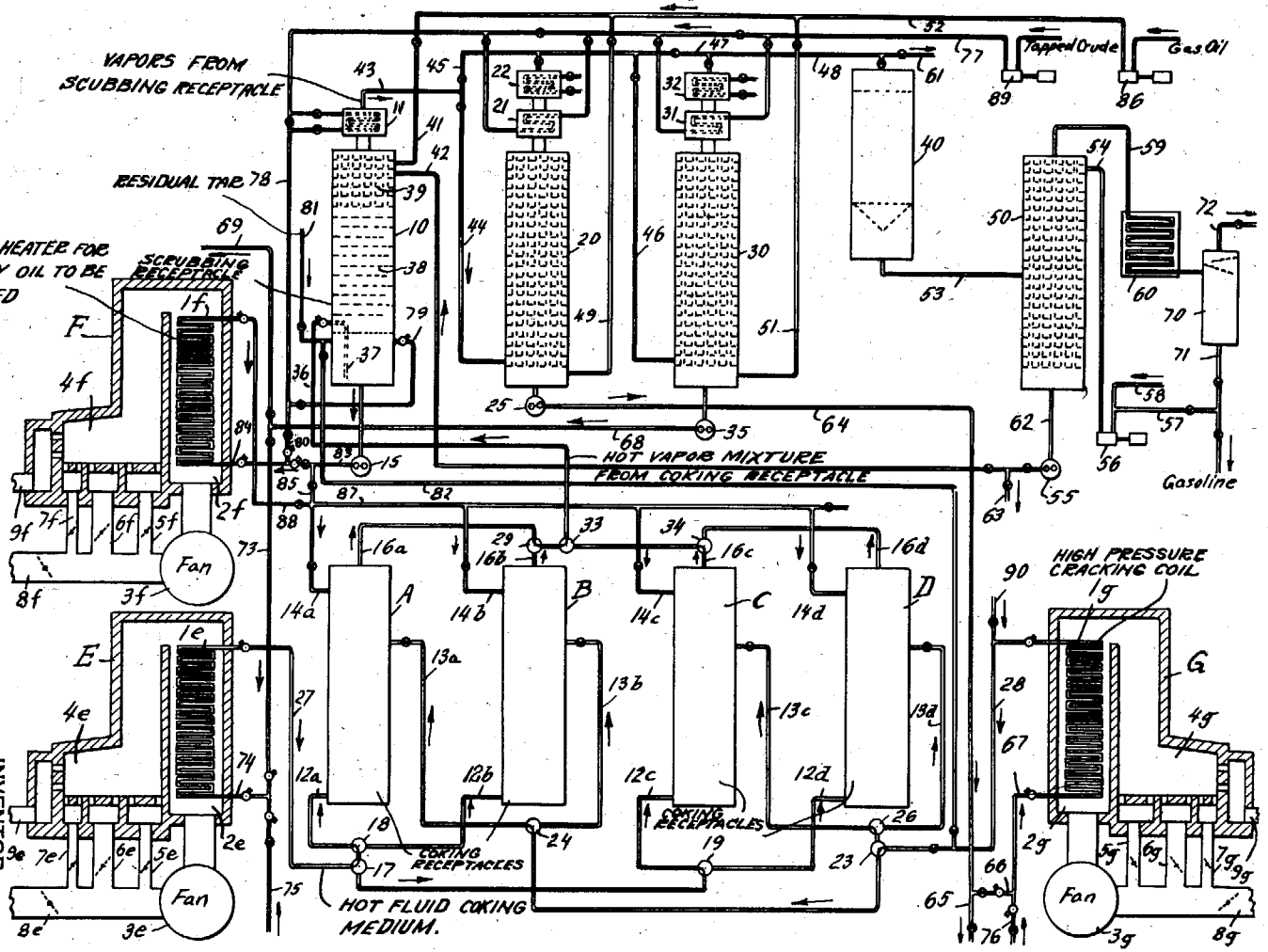
INVENTOR
Harry L. Pelzer
BY
Pennie, Davis, Marvin & Edmonds
ATTORNEYS Reissued June 16, 1936 Re. 20,011

UNITED STATES PATENT OFFICE 20,011

ART OF CRACKING AND COKING HYDROCARBON OILS

Harry L. Pelzer, Houston, Tex., assignor to Sinclair Refining Company, New York, N. Y., a corporation of Maine Original No. 1,937,163, dated November 28, 1933, Serial No. 355,780, April 17, 1929. Application for reissue May 19, 1934, Serial No. 726,617

17 Claims. (Cl. 202—15)

This invention relates to improvements in the coking of heavy oils and residues, such as crude petroleums, topped crudes, flux oils, tars produced in cracking operations for the production of gasoline such as pressure still tar, other residual oils, and the like. The invention relates particularly to improvements in such coking operations in which the heat for coking is supplied by direct heat exchange between the stock to be coked and a gaseous fluid superheated to a temperature upwards of 900° F., the hot oil products discharged from a vapor phase cracking operation, for example.

In one aspect, this invention is an improvement in the operations described in my application Serial No. 340,996, filed February 18, 1929; Patent No. 1,831,719 granted November 10, 1931. In other aspects, however, this invention is of more general application.

According to this invention, the oil stock to be coked is supplied to a coking receptacle within which the coking medium is released as a superheated gaseous fluid and this stock is thereby reduced to coke, the coking medium is superheated in a fire-heated heater prior to its introduction into the coking receptacle, and the stock to be coked is preheated in a separate fire-heated heater to a temperature just short of that at which the deposition of coke in the fire-heated heater begins prior to its introduction into the coking receptacle. The stock to be coked is advantageously so preheated to a temperature upwards of 700° F. or better upwards of 800° F.

In carrying out a combined vapor phase cracking and coking operation as described in Patent No. 1,831,719 mentioned above, for example, there is usually a difference of as much as 150–300° F. or more between the temperature prevailing in the coking operation and the temperature of the residual stock mixture supplied to the coking operation as discharged from the scrubbing operation to which the vapor mixture from the coking operation is subjected. The present invention provides particularly for the reduction of this temperature difference in this type of operation and in this aspect the invention has at least two important advantages. The economy of the combined operation is materially promoted by reducing this temperature difference; for example, charging heavy reduced crude oil to the coking operation and light gas oil to the vapor phase cracking operation and maintaining a vapor discharge temperature from the coking operation approximating 900° F. and from the cracking operation approximating 1100° F., 50 gallons of crude oil at 650° F. or 100 gallons of crude oil at 750° F. or 280 gallons of crude oil at 850° F., approximately may be supplied to the coking operation per 100 gallons of gas oil supplied to the vapor phase cracking operation. The production of a denser coke product is also promoted by reducing this temperature difference.

The present invention also provides generally for the reduction of the temperature difference between the temperature prevailing in such coking operations and the temperature of the stock to be coked as supplied to the coking operation with similar advantages.

While, in carrying out the invention, the stock to be coked may be supplied directly to the fire-heated preheating heater and then to the coking operation, this stock is advantageously preheated by heat exchange with vapors escaping from the coking operation before being supplied to the fire-heated preheating heater. For example, this stock or part of it may be used as a cooling medium in fractionating operations to which vapors from the coking operation are subjected or this stock or part of it may be used as a scrubbing medium in a scrubbing operation to which vapors from the coking operation are subjected. Again for example, in applying this invention in conjunction with the type of combined operation described in Patent No. 1,831,719 mentioned above, the stock to be coked may advantageously be supplied to the scrubbing operation, and there preheated by direct heat exchange with the vapors from the coking operation the resulting residual stock mixture then further preheated in a fire-heated heater, and this stock mixture then supplied to the coking operation.

The present invention may be applied in conjunction with cracking operations for the production of gasoline which produce residual tars with special advantage, and the invention includes certain such combined operations. Residual tars from pressure distillation cracking processes, in which a vapor mixture including vapors of the cracked gasoline product are taken off from a charge of oil undergoing distillation under pressures of say 90–125 pounds per square inch, or higher pressures, or residual tar components of cracking stocks from high pressure cracking processes in which separation of the vapors of the cracked gasoline product is effected under pressures lower than those under which the major heating or heating and digesting is carried out, may be reduced to coke in accordance with this invention with special advantage. Residual tars from low pressure cracking processes may also be reduced to coke in accordance with this invention.

In one particularly advantageous combined operation embodying the invention, the total hot oil products of a high pressure cracking process are discharged with reduction of pressure into a combined evaporating and scrubbing receptacle, a scrubbing medium, such as an oil stock to be coked or a refluxing medium condensing from the components vaporized in this receptacle a stock to be coked, is supplied to this combined evaporating and scrubbing receptacle, the resulting residual stock mixture from the combined evaporating and scrubbing receptacle including the residual components of the hot oil products of the high pressure cracking operation is reheated in a fire-heated heater and then supplied to the coking operation, and the vapors from the coking operation are introduced into the evaporating and scrubbing receptacle. The combined operation of the evaporating and scrubbing receptacle is thus made to serve a number of functions in a particularly advantageous manner; these functions including separation of lower boiling components from tar components of the cracked stock, direct incorporation of these tar components in the stock mixture to be coked, scrubbing of the vapors from the coking operation and initial pre-heating, preceding the reheating, of the stock mixture to be coked. Such composite hot oil products of a high pressure cracking operation may also be discharged, as the pressure is reduced, directly into the receptacle in which the coking operation is carried out.

In another particularly advantageous combined operation embodying the invention, the residual tar from a pressure distillation cracking process is discharged with reduction of pressure into a combined evaporating and scrubbing receptacle, a scrubbing medium, such as a stock to be coked or a refluxing medium condensing from the components vaporized in this receptacle a stock to be coked, is supplied to this combined evaporating and scrubbing receptacle, the resulting residual stock mixture from the combined evaporating and scrubbing receptacle including the residual components of the tar from the pressure distillation operation is reheated in a fire-heated heater and then supplied to the coking operation, and the vapors from the coking operation are introduced into the evaporating and scrubbing receptacle. The combined operation of the evaporating and scrubbing receptacle is thus made to serve a number of functions in a particularly advantageous manner; these functions including separation of vaporizable oil components from the cracked tar, direct incorporation of the remaining tar in the stock mixture to be coked, scrubbing of the vapors from the coking operation and initial preheating, preceding the reheating, of the stock mixture to be coked. Such residual tars may also be discharged, as the pressure is reduced, directly into the receptacle in which the coking operation is carried out. The residual stock remaining after an inital separation of vaporizable oil components from such residual tars, by reduction of pressure in a preceding evaporating operation, for example, may also be discharged into such a combined evaporating and scrubbing receptacle or into the receptacle in which the coking operation is carried out.

In another particularly advantageous combined operation embodying the invention, crude oil, the residual components of which are to be coked, is heated to a distillation temperature in a fire-heated heater, as in conventional pipe-still practice, for example, and then introduced either into the receptacle in which the coking operation is carried out or into a combined evaporating and scrubbing receptacle from which a residual stock mixture is supplied to the receptacle in which the coking operation is carried out. This operation is also applicable to reduced or topped crude oils. In some aspects, this operation is applicable for the production of distilled lubricating oils from such crude stocks. In another such combined operation embodying the invention, crude oil, the residual components of which are to be coked, is heated to a distillation temperature in a fire-heated heater, as in conventional pipe-still practice, for example, and then introduced into an evaporating receptacle, a combined evaporating and scrubbing receptacle into which the vapors from the coking operation are introduced, for example, and the residual stock from this evaporating receptacle is reheated in a separate fire-heated heater to a temperature upwards of 700° F. or better upwards of 800° F. and then introduced either into the receptacle in which the coking operation is carried out or into a scrubbing receptacle, the combined evaporating and scrubbing receptacle mentioned above, for example, from which a residual stock mixture is supplied to the receptacle in which the coking operation is carried out. This operation has a number of special advantages, particularly in that a residual stock free from lower boiling components may thus be supplied to the fire-heated heater through which the stock last passes on its way to the coking operation proper, as mentioned below.

The invention will be further described in connection with the accompanying drawing which illustrates, diagrammatically and conventionally in elevation with parts in section, one form of apparatus adapted for carrying out the invention. It will be understood that other and different apparatus may be used. It will also be understood that the accompanying drawing is intended, primarily, to illustrate the relation of operations in processes embodying the invention; for example, in practice coking receptacles such as the four illustrated are usually arranged as a compact group making the connections between them much shorter than these connections appear in the drawing and the several heaters illustrated are, in practice, usually arranged close to the coking receptacles or scrubbing receptacle to which they are connected. It will also be understood that all of the apparatus illustrated in the accompanying drawing is not necessary for carrying out every process embodying the invention; the illustrated apparatus includes a number of elements which provide for alternative operations but all of which are not necessary for any one operation.

The three fire-heated heaters illustrated, E, F and G, each comprises a group of series connected heating tubes 1 (the reference letter *e*, *f* or *g* is appended on the drawing to identify each element with the heaters E, F and G respectively) arranged in a heating flue 2, a fan 3 for circulating the heating gases from the fire-box 4 through the heating flue 2, and ducts 5, 6, 7 and 8 provided with dampers (as shown) for recirculating part of the heating gases through the heating flue 2 and for discharging part of the heating gases to a stack (not shown) through an air preheater (not shown) for supplying preheated air for combustion through duct 9 to the fire-box C.

The coking receptacles illustrated, A, B, C and D, may be arranged and operated as described in my Patent No. 1,873,024, granted August 23, 1932, for example. Each of these four coking receptacles is provided with a connection 12 (the reference letter *a*, *b*, *c* or *d* is appended on the drawing to identify each element with the receptacles A, B, C and D respectively) for releasing within the receptacle the hot gaseous fluid discharged from heater E, with a connection 13 for supplying oil stock supplied through connection 90 or the preheated oil stock discharged from heater G to the receptacle, with a connection 14 for releasing within the receptacle hot oil products discharged from heater F, and with a connection 16 for conveying the vapor mixture from the receptacle to the scrubbing tower 10. Valves 17, 18 and 19 and valves 23, 24 and 26 are provided to permit, for example, the discharge of the hot gaseous fluid discharged from heater E through connection 27 and the discharge of hot oil products discharged from heater G through connection 28, respectively, into the coking receptacles A, B, C, D, A, etc., in succession and valves 29, 33 and 34 are provided to permit, for example, the discharge of the vapor mixture from the coking receptacles A, B, C, D, A, etc. in succession into the scrubbing tower 10 through connection 36. Valves 17, 18, 23, 24, 29 and 33 are shown as positioned while carrying out a coking operation in receptacle A, receptacle B then being charged for the next coking operation, receptacle C then being steamed out and receptacle D being cleaned after discharge of the coke product of the preceding coking operation, as described in Patent No. 1,873,024, mentioned above. Valves 17, 18, 19, 23, 24, 26, 29, 33 and 34 may, with advantage, be of the type described in Patent No. 1,857,279, granted May 10, 1932, on an application of Eugene C. Herthel and Willis S. Gullette. The connection 12 may be arranged to discharge into the lower part of the coking receptacles or as described in Patent No. 1,873,068, granted August 23, 1932, on an application of George H. Taber, Jr., and Edward W. Isom. The connections 13 and 14 may be arranged to discharge into the upper part of the coking receptacles and, with advantage, to discharge into the coking receptacles above the charge of coke accumulating therein during operation.

The scrubbing tower illustrated, 10, may, with advantage, be constructed and operated as described in Patent No. 1,810,048 granted June 16, 1931, on an application of Eugene C. Herthel. The scrubbing tower 10 comprises a lower, an intermediate and an upper part. The lower part is adapted for maintaining a liquid body of oil during operation normally submerging the inlet connection 37 through which connection 36, from the coking receptacles, discharges. The intermediate part is provided with open baffles 38 and the upper part is provided with "bubble" plates 39. Connections 41 and 42 are provided for the introduction of a refluxing medium into the upper part of the tower. Reflux condenser 11 is also provided for supplying a refluxing medium to the upper part of the tower. Vapors escape from the upper part of tower 10 through connection 43 either to the lower part of tower 20 through connection 44 or to the lower part of tower 30 through connections 45 and 46 or to tower 40 through connections 45, 47 and 48.

The fractionating towers illustrated, 20 and 30, may be of conventional "bubble" tower construction. Either or both of these towers may be operated as described in Patent No. 1,810,048 mentioned above. Connections 49 and 51 are provided for supplying raw oil stock to the lower part of these towers. Raw oil stock, raw gas oil for example, may be supplied to tower 30 or in part to tower 30 through connection 51 or to tower 20 or in part to tower 20 through connection 49 or to tower 10 or in part to tower 10 through connection 41, through connection 52 by means of pump 86. The operation of the towers 20 and 30 may be controlled by means of either or both of the reflux condensers 21 and 22 or either or both of the reflux condensers 31 and 32, respectively. An extraneous cooling medium, water, for example, may be circulated through the heat exchanging coils in either or both by the reflux condensers 22 and 32.

The refining tower 40, in conjunction with the fractionating tower 50, may, with advantage, be arranged and operated as described in application Serial No. 257,953, filed February 29, 1928, by Eugene C. Herthel, granted November 11, 1930, as Patent No. 1,781,388. The refining tower 40 is arranged to subject a vapor mixture passing therethrough to the action of an adsorptive catalyst such as fuller's earth and the fractionating tower 50 is arranged to separate from the composite product discharged from the refining tower through connection 53 the polymers and other high boiling components produced by the vapor-catalyst contact, and any other constituents higher boiling than suitable as components of the desired product. The operation of the fractionating tower 50 may be controlled by the regulated introduction of a refluxing medium through connection 54 by means of pump 56; a part of the product supplied through connection 57 or some similar oil fraction supplied through connection 58, for example. The higher boiling components separated in the tower 50 may be introduced, in whole or in part, into the tower 10 through connections 62 and 42 or discharged through connections 62 and 63 by means of pump 55. The vapors forming the product, gasoline, for example, escape from the upper part of tower 50 through connection 59 to condenser 60 which condenser discharges into receiver 70 from which receiver the product is discharged through connection 71 and uncondensed vapors and gases through connection 72.

Instead of being discharged through the refining tower 40, the vapor mixture escaping through connection 48 may, for example, be discharged through connection 61 to a condenser similar to condenser 60 connected to a receiver similar to receiver 70.

When the tower 20 is in operation, the condensate separated therein is either discharged through connections 64 and 65 or supplied to heater G through connections 64, 66 and 67 by means of hot-oil pump 25. When the tower 30 is in operation, the condensate separated therein is either discharged through connections 68 and 69 or supplied to heater E through connections 68, 73 and 74. Other stocks (water or steam in the case of heater E, for example) or additional stocks may be supplied to the heater E through connections 75 and 74 or to the heater G through connections 76 and 67. Raw stocks or residual oil stocks may be supplied through connection 77 by means of pump 89, passed in whole or in part through the heat exchanging coils in the reflux condenser 31, passed in whole or in part through the heat exchanging coils in the reflux condenser 21, passed in whole or in part through the heat exchanging coils in the reflux condenser 11, and then introduced into the lower part of tower 10 through connections 78 and 79 or in part introduced into the lower part of tower 10 and in part supplied to the heater F through connections 78, 80 and 84. Residual oil stocks, tars from oil cracking operations, for example, may be supplied to the lower part of tower 10 through connection 81, or the total hot oil products from a high pressure cracking operation, for example, may be supplied to the lower part of tower 10 through connection 81, or the hot oil products discharged from heater G may be supplied to the lower part of tower 10 through connections 28 and 82. The residual stock mixture formed in the tower 10 is supplied to the heater F through connections 83 and 84 by means of hot oil pump 15; part of this stock mixture may be by-passed through connection 85 to the manifold 87 connecting the heater E, discharge connection 88 and the connections 14 to the coking receptacles A, B, C and D.

The particular type of hot oil pump illustrated, designated 15, 25, 35 and 55 is described in more detail in Letters Patent No. 1,701,198 issued February 5, 1929, to the Sinclair Refining Company on the application of Thomas de Colon Tifft.

This invention will be further illustrated by the following examples of processes embodying the invention as carried out in the apparatus illustrated in the accompanying drawing.

*First example.*—Water is supplied under pressure to the heater E through connection 75 and in the heater is converted into superheated steam discharged through connection 27 at a temperature approximating 1200° F. and under a pressure approximating 300 pounds per square inch, for example. Calorized tubes are used with advantage in the heater E for carrying out this operation. This superheated steam, the coking medium, is then discharged into the lower end of coking receptacle A through connection 12*a*, or into the lower end of one of the other coking receptacles of the group. The stock to be coked is withdrawn from a liquid body maintained in the lower end of tower 10 and forced, by means of pump 15, through the heater F and then discharged into the upper end of coking receptacle A through connection 14*a*, or into the upper end of one of the other coking receptacles of the group. The liquid body of stock in the lower end of tower 10 is maintained at a temperature approximating 650–750° F. and this stock is discharged from the heater F. at a temperature approximating 825–875° F., for example. The vapor mixture from the coking receptacle is discharged into and beneath the surface of the liquid body maintained in the lower end of tower 10 through connections 36 and 37. The raw oil stock to be coked, a crude oil or a topped crude oil, is supplied to the liquid body maintained in the lower end of tower 10 through connections 77 and 79 or through heater G and connection 82. Topped crudes are usually supplied through connections 77 and 79 although they may be supplied, or in part supplied, through heater G and connection 82. Raw crudes may be supplied through connections 77 and 79, but such stocks are with advantage supplied through the heater G and there heated to a temperature sufficient to effect separation, by vaporization, in the tower 10 of the bulk of components tending to vaporize under the conditions prevailing in the heater F. Any tendency toward the deposition of coke in the heater F is reduced by raising the mean boiling point of the stock or stock mixture supplied to this heater. The towers 10, 20 and 30 are operated, for example, as previously described. Condensate separated in tower 20, for example, may be supplied to heater G with the raw stock to be coked or such condensate may be supplied to heater G and the raw stock to be coked supplied directly to the liquid body maintained in the lower end of tower 10. Vapors escaping from the upper part of tower 10 may also be supplied directly to the lower part of tower 30 without being passed through tower 20. Water separated from the final condensate is returned to the heater E together with any make-up water required.

Crude stocks or similar stocks containing a lubricating oil fraction may be run in accordance with the foregoing example for the separation of the lubricating oil fraction. The lubricating oil fraction is separated as a condensate in tower 20 and discharged through connections 64 and 65.

*Second example.*—Instead of supplying water to the heater E, as in the foregoing example, a hydrocarbon gas mixture, the gases escaping uncondensed from the receiver 70, for example, is supplied to the heater E through connection 75 and there superheated to a temperature upwards of 1150° F. The use of steam as a coking medium, however, is in general more advantageous since it can be heated to a higher temperature without decomposition and since the expense of maintaining circulation of the steam coking medium is usually less than that of maintaining circulation of the gas coking medium.

*Third example.*—Instead of supplying water to the heater E, as in the first example, a light gas oil stock is supplied to the heater E through connection 74 and there subjected to a vapor phase cracking operation from which the hot oil products are discharged at a temperature approximating 1120° F. This light gas oil stock may compr se reflux condensate or a reflux condensate mixture from the tower 30 or a raw stock supplied through connection 75 or a mixture of the two.

*Fourth example.*—A gas oil stock is supplied under pressure to the heater E through connection 74 and there subjected to a vapor phase cracking operation from which the hot oil products are discharged at a temperature approximating 1100–1150° F. and under a pressure approximating 25 pounds per square inch, for example. This vapor mixture, the coking medium, is then discharged into the lower end of coking receptacle A through connection 12*a*, or into the lower end of one of the other coking receptacles of the group. This gas oil stock may comprise reflux condensate from tower 30, or a mixture of reflux condensate from tower 30 and raw stock supplied through connection 51; or raw stock supplied through connection 75, or a mixture of raw stock supplied through connection 75 and condensate or a condensate mixture from tower 30. Residual tar from a pressure distillation cracking process, carried out as described in Letters Patent No. 1,598,136, issued August 31, 1926, to the Sinclair Refining Company on the application of Eugene C. Herthel, for example, is discharged, the pressure being reduced to a pressure approximating 25 pounds per square inch, for example, into the upper end of coking receptacle A through connections 90 and 13*a*, or into the upper end of one of the other coking receptacles of the group. The vapor mixture from the coking receptacle is discharged into and beneath the surface of a liquid body maintained in the lower end of tower 10 through connections 36 and 37. This liquid body of stock in the lower end of tower 10 is maintained at a temperature approximating 700–750° F., for example. Stock is withdrawn from this liquid body and forced, by means of pump 15, through the heater E and then discharged into the upper end of coking receptacle A through connection 14a, or into the upper end of one of the other coking receptacles of the group, at a temperature approximating 850° F., for example. The towers 10, 20 and 30 are operated, for example, as previously described. Condensate separated in tower 20 may be supplied to the heater G and the resulting hot oil products discharged into the coking receptacle with the stock supplied through connection 90, or condensate separated in tower 20 may be discharged through connections 64 and 65, or the vapors escaping from the upper part of tower 10 may be supplied directly to the lower part of tower 30 without being passed through tower 20.

Crude stocks to be coked may also be supplied to the liquid body maintained in the lower end of tower 10 through connections 77 and 79 or through heater G and connection 82 in the process of the foregoing example.

*Fifth example.*—Instead of using the hot oil products discharged from a vapor phase cracking operation as the coking medium, as in the foregoing example, steam or a hydrocarbon gas mixture may be used as the coking medium, as in the first and second examples.

*Sixth example.*—A gas oil stock is supplied under pressure to the heater E through connection 74 and there subjected to a vapor phase cracking operation from which the hot oil products are discharged at a temperature approximating 1100–1150° F. and under a pressure approximating 25 pounds per square inch for example. This vapor mixture, the coking medium, is then discharged into the lower end of coking receptacle A through connection 12a, or into the lower end of one of the other coking receptacles of the group. This gas oil stock may comprise reflux condensate from tower 30, or a mixture of reflux condensate from tower 30 and raw stock supplied through connection 51, or raw stock supplied through connection 75, or a mixture of raw stock supplied through connection 75 and condensate or a condensate mixture from tower 30. Residual tar from a pressure distillation cracking process, carried out as described in Letters Patent No. 1,598,136, mentioned above, for example, is released through connection 81 into the lower end of tower 10 in which tower a pressure approximating 25 pounds per square inch, for example, is maintained. The vapor mixture from the coking receptacle is discharged into and beneath the surface of a liquid body maintained in the lower end of tower 10 through connections 36 and 37. This liquid body includes residual components of the tar released through connection 81. This liquid body is maintained at a temperature approximating 700–725° F., for example, or a somewhat higher temperature. Stock is withdrawn from this liquid body and forced, by means of pump 15, through the heater F and then discharged into the upper end of coking receptacle A through connection 14a, or into the upper end of one of the other coking receptacles of the group, at a temperature approximating 825–850° F., for example. The towers 10, 20 and 30 are operated, for example, as previously described. Condensate separated in tower 20 may be supplied to the heater G and the resulting hot oil products discharged into the coking receptacle, or condensate separated in tower 20 may be discharged through connections 64 and 65, or the vapors escaping from the upper part of tower 10 may be supplied directly to the lower part of tower 30 without being passed through tower 20.

Crude stocks to be coked may also be supplied to the liquid body maintained in the lower end of tower 10 through connections 77 and 79 or through heater G and connection 82 in the process of the foregoing example.

*Seventh example.*—Instead of using the hot oil products discharged from a vapor phase cracking operation as the coking medium, as in the foregoing example, steam or a hydrocarbon gas mixture may be used as the coking medium, as in the first and second examples.

*Eighth example.*—A gas oil stock is supplied under pressure to the heater E through connection 74 and there subjected to a vapor phase cracking operation from which the hot oil products are discharged at a temperature approximating 1100–1150° F. and under a pressure approximating 25 pounds per square inch. This vapor mixture, the coking medium, is then discharged into the lower end of coking receptacle A through connection 12a, or into the lower end of one of the other coking receptacles of the group. This gas oil stock may comprise reflux condensate from tower 30, or a mixture of reflux condensate from tower 30 and raw stock supplied through connection 51, or raw stock supplied through connection 75, or a mixture of raw stock supplied through connection 75 and condensate or a condensate mixture from tower 30. Residual tar from a high pressure cracking process, remaining after vaporization of lower boiling components following initial reduction of pressure on the total hot oil products of the cracking process, the residual tar discharged from the evaporator or expansion chamber in the high pressure cracking process described in Letters Patent No. 1,675,558, issued July 3, 1928, to the Sinclair Refining Company, on the application of Edward W. Isom and Charles L. Parmelee, for example, is supplied to a liquid body maintained in the lower end of tower 10 through connection 81. This liquid body of stock in the lower end of tower 10 is maintained at a temperature approximating 700–750° F., for example. Stock is withdrawn from this liquid body and forced, by means of pump 15, through the heater F and then discharged into the upper end of coking receptacle A through connection 14a, or into the upper end of one of the other coking receptacles of the group, at a temperature approximating 850–875° F., for example. The towers 10, 20 and 30 are operated, for example, as previously described. Condensate separated in tower 20 may be supplied to the heater G and the resulting hot oil products discharged into the coking receptacle, or condensate separated in tower 20 may be discharged through connections 64 and 65 or the vapors escaping from the upper part of tower 10 may be supplied directly to the lower part of tower 30 without being passed through tower 20.

Crude stocks to be coked may also be supplied to the liquid body maintained in the lower end of tower 10 through connections 77 and 79 or through heater G and connection 82 in the process of the foregoing example.

*Ninth example.*—Instead of using the hot oil products discharged from a vapor phase cracking operation as the coking medium, as in the foregoing example, steam or a hydrocarbon gas mixture may be used as the coking medium, as in the first and second examples.

*Tenth example.*—Instead of supplying residual tar from a high pressure cracking process to the liquid body maintained in the lower end of tower 10, as in the eighth and ninth examples, the total hot oil products of a high pressure cracking process are released, the pressure being reduced to a pressure approximating 25 pounds per square inch, for example, within the lower end of tower 10 through connection 81. For example, a gas oil stock is supplied under pressure to the heater G through connection 76 and there subjected to a high pressure cracking operation from which the hot oil products are discharged at a temperature approximating 850–950° F. and under a pressure approximating 400–600 pounds per square inch, for example, and the total hot oil products of this operation are released, with reduction of pressure as discharged from the heater G, into the lower end of tower 10 through connections 28 and 82.

*Eleventh example.*—Instead of releasing the total hot oil products of a high pressure cracking operation into the lower end of tower 10, as in the tenth example, the total hot oil products of a high pressure cracking operation are discharged with reduction of pressure, into the upper end of coking receptacle A through connections 90 and 13*a*, or into the upper end of one of the other coking receptacles of the group.

It will be understood that the foregoing examples are for the purpose of exemplification and that the invention is not limited to the operations there described as carried out in the apparatus illustrated in the accompanying drawing.

The present invention provides, in its more advantageous embodiments, a combined operation in which the advantages of a relatively low temperature difference between the temperature prevailing in the coking operation and the temperature of the stock to be coked as supplied to the coking operation, as previously mentioned, are secured and further in which particularly favorable conditions are maintained with respect to operation of the fire-heated heater in which the stock to be coked is preheated. In these more advantageous embodiments of the invention, the stock supplied to this fire-heated heater contains a minimum of components tending to vaporize in the heater. Such components are separated, for example, in the scrubbing operation. In this respect, the invention makes possible the maintenance of a higher discharge temperature from this heater, without involving difficulties due to deposition of coke therein, and consequently makes possible the maintenance of a lower temperature difference between the temperature prevailing in the coking operation and the temperature of the stock to be coked as supplied to the coking operation.

I claim:

1. In coking hydrocarbon oils, the improvement which comprises supplying a hydrocarbon oil to a vapor phase cracking operation, vaporizing and cracking the oil in the vapor phase therein, releasing the hot vapor mixture from the vapor phase cracking operation at a temperature upwards of 900° F. within a coking receptacle, separately preheating a heavy hydrocarbon oil to be coked by the addition of heat from an extraneous source and simultaneously introducing said heavy hydrocarbon oil to be coked into the coking receptacle at a rate at least as great as that at which oil is supplied to the vapor phase cracking operation and at a temperature less than 150° F. lower than the temperature prevailing in the coking receptacle, and reducing the heavy oil to coke therein.

2. In coking hydrocarbon oils, the improvement which comprises supplying a hydrocarbon oil to a vapor phase cracking operation, vaporizing and cracking the oil in the vapor phase therein, releasing the hot vapor mixture from the vapor phase cracking operation at a temperature upwards of 900° F. within a coking receptacle, heating a heavy hydrocarbon oil to be coked to a temperature upwards of about 750° F. by supplying heat thereto from an extraneous source in a heating zone separate from the heating zone used in the vapor phase cracking operation, introducing the thus preheated heavy oil into the coking receptacle into direct contact with the hot vapor mixture discharged from the vapor phase cracking operation at a rate at least as great as that at which oil is supplied to the vapor phase cracking operation, and reducing said heavy oil to coke therein.

3. In coking heavy hydrocarbon oils, the improvement which comprises heating a fluid coking medium to a temperature upwards of 900° F. in a heating zone by supplying heat from an extraneous source and releasing the thus heated coking medium within a coking receptacle, heating a heavy oil stock to be coked to a temperature upwards of about 750° F. in a separate heating zone by supplying heat from an extraneous source and introducing the thus preheated stock into the coking receptacle at a rate at least as great as that at which the fluid coking medium is supplied to the said heating zone, and reducing the said heavy oil stock to coke in the coking receptacle.

4. In coking heavy hydrocarbon oils, the improvement which comprises heating a fluid coking medium to a temperature upwards of 900° F. in a heating zone by supplying heat from an extraneous source and releasing the thus heated coking medium within a coking receptacle, heating a heavy oil stock to be coked to a temperature upwards of 800° F. in a separate heating zone by supplying heat from an extraneous source and introducing the thus preheated stock into the coking receptacle at a rate at least as great as that at which the fluid coking medium is supplied to the said heating zone, and thereby reducing the said heavy oil stock to coke in the coking receptacle.

5. In coking hydrocarbon oils, the improvement which comprises heating a hydrocarbon oil in a heating zone to vaporize the oil and crack the vapors in the vapor phase, releasing the hot vapor mixture from the vapor phase cracking operation at a temperature upwards of 900° F. within a coking receptacle, discharging the hot vapor mixture from the coking receptacle into and beneath the surface of a liquid body of heavy hydrocarbon oil in a scrubbing receptacle, withdrawing liquid oil from said body and heating the oil so withdrawn to a temperature upwards of 700° F. by supplying heat thereto from an extraneous source in a heating zone separate from the heating zone used in the vapor phase cracking operation, and introducing the thus heated oil into the coking receptacle and reducing it to coke therein.

6. In coking hydrocarbon oils, the improvement which comprises heating a hydrocarbon oil in a heating zone to vaporize the oil and crack the vapors in the vapor phase, releasing the hot vapor mixture from the vapor phase cracking operation at a temperature upwards of 900° F. within a coking receptacle, supplying heavy oil stock to be coked to said coking receptacle, discharging the hot vapor mixture from the coking receptacle into and beneath the surface of a liquid body of heavy hydrocarbon oil in a scrubbing receptacle, withdrawing oil from said liquid body and heating the oil so withdrawn to a temperature upwards of 700° F. by supplying heat thereto from an extraneous source in a heating zone separate from the heating zone used in the vapor phase cracking operation, and introducing the thus heated oil into the coking receptacle and reducing it to coke therein.

7. In coking hydrocarbon oils, the improvement which comprises heating a hydrocarbon oil in a heating zone to vaporize the oil and crack it in the vapor phase, releasing the hot vapor mixture from the vapor phase cracking operation at a temperature upwards of 900° F. within a coking receptacle, discharging the hot vapor mixture from the coking receptacle into and beneath the surface of a liquid body of heavy hydrocarbon oil in a scrubbing receptacle, supplying heavy oil stock to be coked to said scrubbing receptacle, withdrawing oil from said liquid body and heating the oil so withdrawn to a temperature upwards of 700° F. by supplying heat thereto from an extraneous source in a heating zone separate from the heating zone used in the vapor phase cracking operation, and introducing the thus heated oil into the coking receptacle and reducing it to coke therein.

8. In coking tars from cracking operations in which hydrocarbon oils are cracked for the production of gasoline and the low boiling products are separated from the tar by distillation, the improvement which comprises heating a hydrocarbon oil in a separate heating zone to vaporize the oil and crack the vapors in the vapor phase, releasing the hot vapor mixture from a vapor phase cracking operation at a temperature upwards of 900° F. within a coking receptacle, simultaneously supplying tar from a cracking operation of the type first mentioned to said coking receptacle, discharging the hot vapor mixture from the coking receptacle into and beneath the surface of a liquid body of heavy hydrocarbon oil in a scrubbing receptacle, withdrawing oil from said liquid body and heating the oil so withdrawn to a temperature upwards of 700° F. by supplying heat thereto from an extraneous source in a heating zone separate from the heating zone used in the vapor phase cracking operation, introducing the thus heated oil into the coking receptacle in direct contact with the hot vapor mixture from the vapor phase cracking operation, and thereby reducing the thus heated oil and the tar to coke in the coking receptacle.

9. In coking tars from cracking operations in which hydrocarbon oils are cracked for the production of gasoline and the low boiling products are separated from the tar by distillation, the improvement which comprises heating a hydrocarbon oil in a separate heating zone to vaporize the oil and crack the vapors in the vapor phase, releasing the hot vapor mixture from the vapor phase cracking operation at a temperature upwards of 900° F. within a coking receptacle, discharging the hot vapor mixture from the coking receptacle into and beneath the surface of a liquid body of heavy hydrocarbon oil in a scrubbing receptacle, supplying tar from a separate cracking operation of the type first mentioned to said scrubbing receptacle, withdrawing oil from said liquid body and heating the oil so withdrawn to a temperature upwards of 700° F. by supplying heat thereto from an extraneous source in a heating zone separate from the heating zone used in the vapor phase cracking operation, and introducing the thus heated oil into the coking receptacle into direct contact with the hot vapor mixture discharged from the vapor phase cracking operation and reducing it to coke therein.

10. In coking tars from cracking operations for the production of gasoline, the improvement which comprises heating a fluid coking medium to a temperature upwards of 900° F. by supplying heat thereto from an extraneous source in a heating zone and releasing the thus superheated coking medium within a coking receptacle, heating a tar from a cracking operation for the production of gasoline to a temperature upwards of about 750° F. in a separate heating zone by supplying heat thereto from an extraneous source and introducing the thus preheated tar into the coking receptacle at a rate at least as great as that at which the said fluid coking medium is supplied to the said heating operation, and reducing the tar to coke in the coking receptacle.

11. In coking hydrocarbon oils, the improvement which comprises heating a hydrocarbon oil in a heating zone to vaporize the oil and crack it in the vapor phase, releasing the hot vapor mixture from the vapor phase cracking operation at a temperature upwards of 900° F. within a coking receptacle, discharging the hot vapor mixture from the coking receptacle into a scrubbing receptacle, cracking a heavy hydrocarbon oil under high pressure and discharging the total hot oil products of the high pressure cracking operation with reduction of pressure into the scrubbing receptacle, separately supplying a liquid hydrocarbon oil to the scrubbing receptacle, scrubbing the vapors with said liquid hydrocarbon oil in the scrubbing receptacle and discharging vapors therefrom, withdrawing a residual oil mixture from the scrubbing receptacle and heating the residual oil mixture withdrawn from the scrubbing receptacle to a temperature upwards of 700° F. by supplying heat thereto from an extraneous source in a heating zone separate from the heating zone used in the vapor phase cracking operation, and introducing the thus heated oil mixture into the coking receptacle into direct contact with the hot vapor mixture discharged from the vapor phase cracking operation and reducing it to coke therein.

12. In coking tars from cracking operations in which heavy hydrocarbon oils are cracked under high pressure for the production of gasoline and the low boiling products are separated from the tar by distillation, the improvement which comprises heating a hydrocarbon oil in a heating zone to vaporize the oil and crack it in the vapor phase, releasing the hot vapor mixture from the vapor phase cracking operation at a temperature upwards of 900° F. within a coking receptacle, discharging the hot vapor mixture from the coking receptacle into a scrubbing receptacle, discharging residual tar from a separate cracking operation of the type first mentioned with reduction of pressure into the scrubbing receptacle, supplying a liquid oil as a scrubbing medium to the scrubbing receptacle, scrubbing the vapors with said liquid oil in the scrubbing receptacle and discharging vapors therefrom, withdrawing a residual oil mixture from the scrubbing receptacle and heating the residual oil mixture withdrawn from the scrubbing receptacle to a temperature upwards of 700° F. by supplying heat thereto from an extraneous source in a heating zone separate from the heating zone used in the vapor phase cracking operation, and introducing the thus heated residual oil mixture into the coking receptacle into direct contact with the hot vapor mixture discharged from the vapor phase cracking operation and reducing it to coke therein.

13. In coking crude oil stocks, the improvement which comprises heating a crude hydrocarbon oil stock to a distillation temperature by supplying heat thereto from an extraneous source in a heating zone and introducing the thus heated stock into a coking receptacle, simultaneously heating a fluid coking medium to a temperature upwards of 900° F., supplying heat thereto from an extraneous source in a heating zone separate from the first mentioned heating zone and releasing the thus heated coking medium within the coking receptacle, discharging the hot vapor mixture from the coking receptacle into a scrubbing receptacle, discharging vapors from the scrubbing receptacle, withdrawing a residual oil mixture from the scrubbing receptacle and heating the residual oil mixture withdrawn from the scrubbing receptacle to a temperature upwards of 700° F. by supplying heat thereto from an extraneous source in a heating zone separate from the first two mentioned heating zones, and introducing the thus heated residual oil mixture into the coking receptacle into direct contact with the fluid coking medium discharged from the second said heating zone and reducing the residual oil mixture and the crude oil stock to coke therein.

14. In coking crude oil stocks, the improvement which comprises heating a crude hydrocarbon oil stock to a distillation temperature in a heating zone by supplying heat thereto from an extraneous source and introducing the thus heated stock into a scrubbing receptacle, heating a fluid coking medium to a temperature upwards of 900° F. in a separate heating zone by supplying heat thereto from an extraneous source and releasing the thus heated coking medium within a coking receptacle, discharging the hot vapor mixture from the coking receptacle into the scrubbing receptacle, discharging vapors from the scrubbing receptacle, withdrawing a residual oil mixture from the scrubbing receptacle and heating the residual oil mixture withdrawn from the scrubbing receptacle to a temperature upwards of 700° F. in another heating zone separate from the first two mentioned heating zones by supplying heat thereto from an extraneous source, and introducing the thus heated residual oil mixture into the coking receptacle into direct contact with the fluid coking medium released from the second mentioned separate heating zone and reducing it to coke therein.

15. In coking crude oil stocks, the improvement which comprises heating a fluid coking medium to a temperature upwards of 900° F. in a heating zone by supplying heat thereto from an extraneous source and releasing the thus heated coking medium within a coking receptacle, discharging the hot vapor mixture from the coking receptacle into and beneath the surface of a liquid body of heavy hydrocarbon oil in a scrubbing receptacle, supplying a crude hydrocarbon oil stock to said liquid body of oil, withdrawing liquid oil from said body and heating the oil withdrawn from said liquid body to a temperature upwards of 700° F. by supplying heat thereto from an extraneous source in a separate heating zone, and introducing the thus heated oil into the coking receptacle into direct contact with the fluid coking medium released within the coking receptacle and reducing it to coke therein.

16. In coking hydrocarbon oils, the improvement which comprises releasing superheated steam at a temperature upwards of 900° F. within a coking receptacle, discharging a hot vapor mixture from the coking receptacle into and beneath the surface of a liquid body of heavy hydrocarbon oil in a scrubbing receptacle, withdrawing liquid oil from said body and heating oil withdrawn from said liquid body to a temperature upwards of 700° F. by supplying heat thereto from an extraneous source in a separate heating zone, and introducing the thus heated oil into the coking receptacle and reducing it to coke therein.

17. In coking hydrocarbon oils, the improvement which comprises heating a heavy hydrocarbon oil to be coked to a temperature upwards of about 750° F. in a heating zone by supplying heat thereto from an extraneous source and introducing the thus preheated oil into a coking receptacle, and heating steam to a temperature upwards of 900° F. by supplying heat thereto from an extraneous source in a separate heating zone, and releasing the thus superheated steam within the coking receptacle at a rate not exceeding the rate at which said stock to be coked is supplied to the coking receptacle, and reducing said stock to coke in the coking receptacle.

HARRY L. PELZER.